Patented Oct. 8, 1946

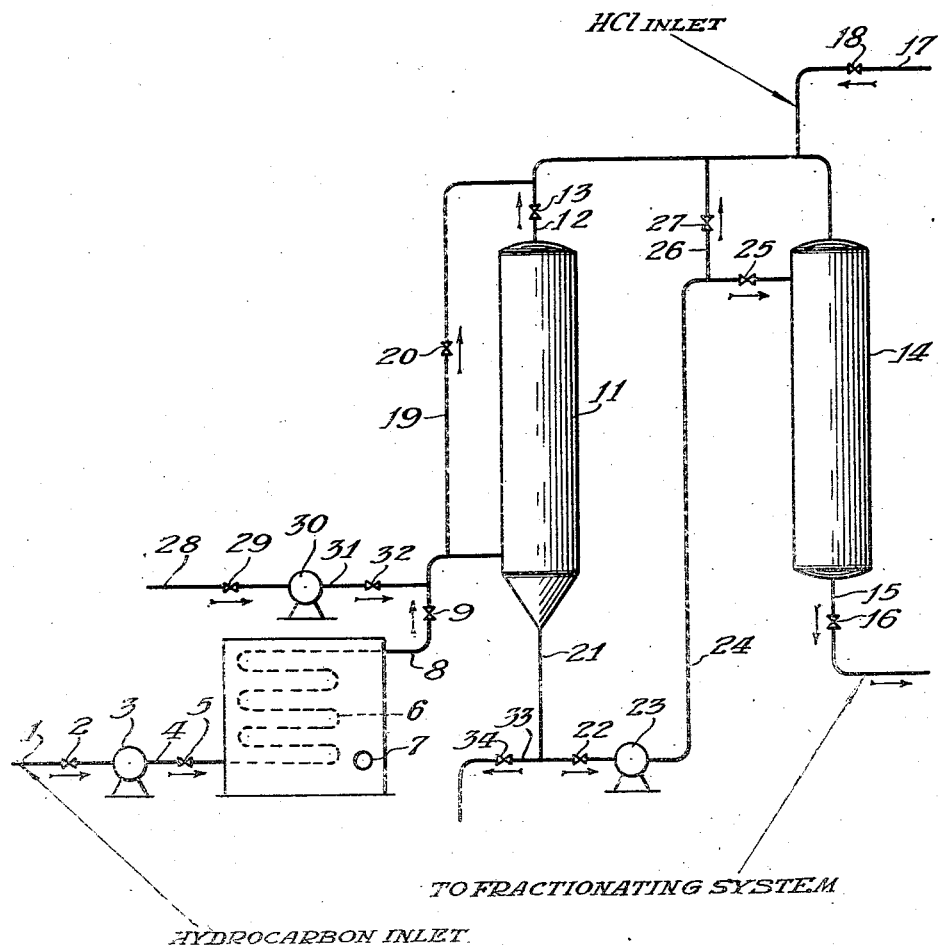

2,408,941

UNITED STATES PATENT OFFICE 2,408,941

PRODUCTION OF ISOPARAFFINS

Julian M. Mavity and Walter E. Moss, Chicago, Ill., assignors to Universal Oil Products Company, Chicago, Ill., a corporation of Delaware Application June 22, 1942, Serial No. 447,956

15 Claims. (Cl. 260—683.5)

This invention relates to the catalytic conversion of straight chained or mildly branched saturated hydrocarbons to more branched saturated hydrocarbons and is specifically concerned with an improved method of operation whereby the effective utilization of the catalyst is considerably increased.

The invention herein disclosed is primarily concerned with processes in which the catalyst is introduced into the reaction zone by the hydrocarbon reactants. This method of operating is particularly adaptable to such hydrocarbon conversion processes as isomerization of butane and other hydrocarbons, production of isobutane and isopentane from normal pentane, and alkylation of paraffins and aromatics with olefins.

In the ordinary operation of the above processes, the amount of catalyst carried in to the reaction zone by the hydrocarbon reactants is dependent primarily on the solubility of the catalyst in the particular hydrocarbon being charged. Of course, this solubility may be varied by varying the temperature of the hydrocarbon medium.

It has been noted that during the operation of these processes, the quality of the desired products tends to decrease, indicating that the catalyst concentration in the reaction zone has diminished. This necessitates increasing the temperature to provide sufficient catalyst carry over. One of the major difficulties encountered when using such catalysts as aluminum chloride and aluminum bromide in such processes is the formation of a catalyst-hydrocarbon complex commonly called sludge.

We have discovered that the solubility of the sludge formed by the reaction of the hydrocarbons and catalyst is considerably less than the catalyst itself. This sludge formed upon the catalyst tends to coat or dissolve the unreacted catalyst and by formation of this relatively insoluble coating on the catalyst particles, prevent the hydrocarbon carrying medium from effectively dissolving the catalyst. As a result, the catalyst concentration in the effluent stream from the catalyst supply is gradually decreased as the formation of sludge within the supply chamber increases. This tends to decrease the catalyst activity in the reactor and a decrease in quality of desired products hereinbefore referred to results. In order to provide the necessary catalyst in the reaction zone, it is necessary to operate at higher temperatures to increase the solubility of the aluminum chloride in the hydrocarbon. By operating at higher temperatures, however, the difficulties are aggravated because the higher temperatures tend to increase the rate of formation of the sludge materials. This effect gradually increases the catalyst consumption per unit volume of the desired reaction products until the process is no longer economically feasible.

We have discovered that the difficulties recited above may be substantially eliminated by operating in a manner hereinafter described. We have found that by introducing the hydrocarbons near the bottom of the bed of catalyst so that any sludge formed will drain off before contacting the main body of the catalyst and continually removing the sludge as formed, the remaining portion of the catalyst bed will remain in a solid granular form and permit its use at a normal consumption rate.

In view of the first discovery as to the effect of the sludge on the activity of the aluminum halide catalyst, it would seem safe to assume that the same effect would occur in the reaction zone. However, we have discovered that this is not true. By introducing the sludge into the reaction zone, unexpected high yields of the desired products were obtained per unit weight of catalyst consumed.

In one specific embodiment, the present invention relates to a process for the production of highly branched chain paraffins from less branched chain paraffins which comprises passing a stream of said less branched chain paraffins through a bed of granular aluminum chloride disposed in catalyst supply zone under conditions so regulated as to form a hydrocarbon-aluminum chloride solution containing a sufficient amount of aluminum chloride to promote the desired reaction, commingling the effluent stream from the catalyst supply zone with regulated amounts of hydrogen chloride and sludge withdrawn from the catalyst supply zone, introducing said mixture into a packed reaction zone maintained under isomerizing conditions whereby a substantial portion of the hydrocarbons charged are converted to isomers thereof.

The hydrocarbons which may be treated in the process herein disclosed will comprise paraffinic hydrocarbons either normal or mildly branched, mixtures of such paraffins, or mixtures of paraffins and naphthenes such as straight run gasoline or naphtha fractions.

The terms, aluminum halide and hydrogen halide as referred to in this specification and the appended claims, are meant to include only aluminum bromide and aluminum chloride, and hydrogen chloride and hydrogen bromide respectively.

The operation of the proposed process will be more fully explained in the description of the accompanying diagrammatic sketch which illustrates in conventional side elevation, one type of apparatus in which the objects of the invention may be obtained.

In order to simplify the description of the drawing, such equipment as condensers, heat exchangers, cac., which are not essential to the explanation have been omitted.

Referring to the drawing, the hydrocarbon charge, for example, normal pentane is introduced through line 1 containing valve 2 into pump 3 which discharges through line 4 containing valve 5 into heating coil 6 disposed in furnace 7 wherein the hydrocarbons are heated to a temperature sufficient to compensate for any loss due to radiation, conduction or convection during the passage of the hydrocarbon through line 8 containing valve 9, and still be introduced at the desired temperature into catalyst supply tower 11. This temperature will vary depending upon the type of hydrocarbon charged, but is ordinarily within the range of 70 to 300° F. and preferably between 120–210° F. Since the necessary catalyst for the reaction will be carried out of supply tower 11 dissolved in the hydrocarbon, it is essential that tower 11 be maintained under a pressure sufficient to keep the hydrocarbon in a substantially liquid phase. It is obvious that the temperature to which these hydrocarbons are heated must be chosen so that it will be below the critical temperature of said hydrocarbons in order to insure sufficient liquid to dissolve the catalyst therein. If too much sludge formation results due primarily to the presence of impurities such as olefins and aromatics in the charge, a portion of said charging stock may by-pass the catalyst tower through line 19 containing valve 20 and thereafter will be combined with the effluent stream leaving tower 11 through line 12 containing valve 13. The combined streams will then be commingled with hydrogen chloride introduced through line 17 containing valve 18 and the total mixture introduced to reaction chamber 14. In case it is desired that the combined streams be introduced into reaction zone 14, in a substantially vapor phase, the necessary heat for the vaporization of the effluent stream from catalyst supply zone 11 may be introduced by the hydrocarbon passing through line 19. The aluminum chloride-hydrocarbon complex commonly called "sludge" is withdrawn through line 21 containing valve 22 by pump 23 as rapidly as it is formed in catalyst supply zone 11. The sludge is then discharged through line 24 containing valve 25 into reaction zone 14. This material still possesses some catalytic activity and by operating in this manner, it is possible to increase the production of the desired isomeric compounds per unit weight of catalyst consumed. A portion of the hydrocarbon complex may be introduced directly into line 12 through line 26 containing valve 27. In order to prevent a buildup of the sludge, a portion may be withdrawn from the system through line 33 containing valve 34.

Reaction zone 14 may comprise a large packed chamber containing such granular packing materials as porcelain, pumice, fire brick, quartz, activated charcoal, other activated carbons, diatomaceous earth, kaolin, zirconia, raw and acid treated clay, silica gel, alumina, magnesia, titania, compounds of silica with alumina and with zirconia and also metals containing surface such as spongy iron. Instead of a packed chamber, reaction zone 14 may comprise a large empty chamber preferably baffled which will provide sufficient reaction time to produce the desired products.

The temperature of the reactant in chamber 14 is dependent upon the hydrocarbon charged, hydrogen halide concentration and contact time of the reactants and catalyst, but will ordinarily be within the approximate range of 100 to 500° F. and preferably between 150 to 300° F. under a pressure within the range of about atmospheric to 2000 pounds per square inch.

The amount of hydrogen halide added to the reaction zone will vary depending upon the hydrocarbon charge and the operating conditions being utilized. In general, however, the hydrogen halide concentration will decrease as the severity of the remaining operating conditions is increased. This concentration will ordinarily be less than approximately 1 mol of hydrogen halide per mol of hydrocarbon charged. The reaction products are withdrawn through line 15 containing valve 16 and are directed to any suitable fractionating and separating system wherein the desired products are separated from the unconverted materials which may be recycled back to line 4. The separated sludge and unreacted aluminum chloride may be recycled back to the reaction zone.

It is sometimes desirable in order to prevent too much sludging in catalyst supply tower 11 to introduce small amounts of hydrogen along with the charging stock. The hydrogen may be introduced through line 28 containing valve 29 into pump 30 which discharges through line 31 containing valve 32 into the line 8 containing the heated hydrocarbon. The amount of hydrogen will vary, depending upon the charging stock and conditions of operation, but will ordinarily be less than 15 moles per 100 moles of hydrocarbon. It is also possible if desired to introduce hydrogen chloride through line 28 either with or without the hydrogen.

The following example illustrates one specific operation conducted in accordance with the process of the invention although the example is not intended to unduly limit the scope thereof.

Normal pentane was heated to a temperature of 212° F. and introduced into a chamber filled with granular aluminum chloride and maintained under a pressure of 500 pounds per square inch gauge. The effluent stream was commingled with 6.5 moles of hydrogen chloride per 100 moles of pentane and the resulting mixture heated to a temperature of 200° C. and introduced under a pressure of 500 pounds per square inch gauge into a reactor packed with ¼" semi-porcelain berl saddles. The sludge formed was removed continuously during the run.

The following yields were obtained.

| | Yields, wt. per cent $n$ pentane charge |
|---|---|
| $iC_4H_{10}$ | 20 |
| $nC_4H_{10}$ | 1 |
| $iC_5H_{12}$ | 23 |
| $nC_5H_{12}$ | 41 |
| $C_6+$ | 11 |
| Unaccounted | 4 |
| | 100 |

The catalyst remaining in the first tower was in excellent shape after 82 hours of continuous operation.

When a similar operation is conducted without the withdrawal of the sludge as it is formed, the entire catalyst mass becomes liquefied. The solubility of the sludge in the hydrocarbons is so low that an insufficient amount is carried over into the reaction zone. The catalyst activity in this zone decreases rapidly making it necessary to discontinue the operation.

We claim as our invention:

1. In a hydrocarbon conversion process wherein a desired hydrocarbon conversion reaction is catalyzed by means of an aluminum halide catalyst and a hydrogen halide promoter, the continuous method of operation which comprises passing at least a portion of the hydrocarbon to be converted in substantially liquid phase condition and in the absence of said promoter upwardly through a bulk supply of aluminum halide disposed in a catalyst supply zone maintained at conditions substantially incapable of effecting the desired hydrocarbon conversion reaction, dissolving a portion of said aluminum halide in the hydrocarbon during passage thereof through said catalyst supply zone, a relatively small amount of an aluminum halide-hydrocarbon complex being formed which is substantially insoluble in said hydrocarbon but said desired hydrocarbon conversion being substantially precluded, supplying the hydrocarbon effluent containing aluminum halide in dissolved form only from said catalyst supply zone to an independent reaction zone maintained at conversion conditions, introducing a hydrogen halide promoter to said reaction zone and therein effecting the desired conversion of said hydrocarbon, and withdrawing said complex from the lower portion of said catalyst supply zone substantially as fast as it is formed in order to avoid substantial contamination of the bulk supply of aluminum halide and consequent diminution of the solubility of the aluminum halide in the hydrocarbon.

2. In a hydrocarbon conversion process wherein a desired hydrocarbon conversion reaction is catalyzed by means of an aluminum halide catalyst and a hydrogen halide promoter, the continuous method of operation which comprises passing at least a portion of the hydrocarbon to be converted in substantially liquid phase condition and in the absence of said promoter upwardly through a bulk supply of aluminum halide disposed in a catalyst supply zone, dissolving a portion of said aluminum halide in the hydrocarbon during passage thereof through said catalyst supply zone, a relatively small amount of said hydrocarbon being converted to an aluminum halide-hydrocarbon complex which is substantially insoluble in said hydrocarbon but said desired hydrocarbon conversion being substantially precluded by the absence of a promoter, supplying the hydrocarbon effluent containing aluminum halide in dissolved form only from said catalyst supply zone to an independent reaction zone, introducing a hydrogen halide promoter to said reaction zone, withdrawing said complex from the lower portion of said catalyst supply zone substantially as fast as it is formed in order to avoid substantial contamination of the bulk supply of aluminum halide and consequent diminution of the solubility of the aluminum halide in the hydrocarbon, introducing thus withdrawn complex to said reaction zone and therein effecting the desired conversion of said hydrocarbon in the presence of aluminum halide supplied thereto in said complex and in solution in said effluent.

3. In an isomerization process wherein a paraffin hydrocarbon is isomerized by the action of an aluminum halide catalyst and a hydrogen halide promoter, the continuous method of operation which comprises passing a paraffin hydrocarbon in substantially liquid phase condition and in the absence of said promoter upwardly through a bulk supply of aluminum halide disposed in a catalyst supply zone maintained at conditions incapable of effecting any substantial isomerization of said paraffin, dissolving a portion of said aluminum halide in said hydrocarbon during the passage thereof through said catalyst supply zone, a relatively small amount of an aluminum halide-hydrocarbon complex being formed which is substantially insoluble in said hydrocarbon but isomerization of said hydrocarbon being substantially precluded, supplying the hydrocarbon effluent containing aluminum halide in dissolved form only from said catalyst supply zone to an independent reaction zone maintained at isomerizing conditions, introducing a hydrogen halide promoter to said reaction zone and therein effecting isomerization of said paraffin hydrocarbon, and withdrawing said complex from the lower portion of said catalyst supply zone substantially as fast as it is formed in order to avoid substantial contamination of the bulk supply of aluminum halide and consequent diminution of the solubility of the aluminum halide in the hydrocarbon.

4. In an isomerization process wherein a paraffin hydrocarbon is isomerized by the action of an aluminum halide catalyst and a hydrogen halide promoter, the continuous method of operation which comprises passing a paraffin hydrocarbon in substantially liquid phase condition and in the absence of said promoter upwardly through a bulk supply of aluminum halide disposed in a catalyst supply zone, dissolving a portion of said aluminum halide in said hydrocarbon during the passage thereof through said catalyst supply zone, a relatively small amount of said hydrocarbon being converted to an aluminum halide-hydrocarbon complex which is substantially insoluble in said hydrocarbon but isomerization of said hydrocarbon being substantially precluded by the absence of a promoter from said zone, supplying the hydrocarbon effluent containing aluminum halide in dissolved form only from said catalyst supply zone to an independent reaction zone, introducing a hydrogen halide promoter to said reaction zone, withdrawing said complex from the lower portion of said catalyst supply zone substantially as fast as it is formed in order to avoid substantial contamination of the bulk supply of aluminum halide and consequent diminution of the solubility of the aluminum halide in the hydrocarbon, introducing thus withdrawn complex to said reaction zone and therein effecting isomerization of said paraffin hydrocarbon in the presence of aluminum halide supplied thereto in said complex and in solution in said effluent.

5. In a hydrocarbon conversion process wherein controlled amounts of an aluminum halide catalyst and a hydrogen halide promoter are supplied to a conversion zone, the improved method of continuous operation which comprises passing at least a portion of the hydrocarbon reactant in substantially the liquid phase and at a substantially uniform temperature in the absence of said promoter upwardly through a catalyst supply zone containing a bulk supply of aluminum halide to dissolve a portion of the aluminum halide in the hydrocarbon, said zone being maintained at conditions substantially incapable of effecting conversion of said hydrocarbon to desired hydrocarbon conversion products, withdrawing from the lower portion of said catalyst supply zone as rapidly as it is formed an aluminum halide-hydrocarbon complex produced incidentally therein whereby to avoid substantial contamination of said bulk supply of aluminum halide and consequent diminution of the solubility of the aluminum halide in the hydrocarbon, supplying to said conversion zone maintained under conversion conditions a hydrogen halide promoter and the effluent hydrocarbon stream from said catalyst supply zone containing a substantially constant concentration of aluminum halide in dissolved form only, and effecting the desired hydrocarbon conversion reaction in said conversion zone.

6. The process of claim 5 further characterized in that said aluminum halide comprises aluminum chloride.

7. A process for the conversion of a hydrocarbon reactant which comprises passing at least a portion of said reactant in substantially liquid phase condition through a bulk supply of aluminum halide disposed in a catalyst supply zone, said zone being maintained at conditions suitable for dissolving a portion of said aluminum halide in said reactant but substantially incapable of effecting the desired hydrocarbon conversion reaction, supplying the hydrocarbon effluent containing aluminum halide in dissolved form only from said catalyst supply zone to a separate reaction zone maintained at conversion conditions, withdrawing from the lower portion of said catalyst supply zone an aluminum halide-hydrocarbon complex formed incidentally therein, supplying at least a portion of said complex to said reaction zone, and effecting the desired conversion of said hydrocarbon reactant in said reaction zone.

8. The process of claim 7 further characterized in that the aluminum halide comprises aluminum chloride.

9. A process for isomerizing a paraffin hydrocarbon which comprises passing at least a portion of the paraffin to be isomerized through a bulk supply of aluminum halide disposed in a catalyst supply zone, said zone being maintained at conditions suitable for dissolving a portion of said aluminum halide in said paraffin but incapable of effecting any substantial isomerization of said paraffin, supplying the hydrocarbon effluent containing aluminum halide in dissolved form only from said catalyst supply zone to a separate isomerization zone maintained at isomerizing conditions, withdrawing from the lower portion of said catalyst supply zone an aluminum halide-hydrocarbon complex formed incidentally therein, supplying at least a portion of said complex to said isomerization zone, and effecting the isomerization of said paraffin hydrocarbon in said isomerization zone.

10. The process of claim 9 further characterized in that the aluminum halide comprises aluminum chloride.

11. The process of claim 9 wherein said paraffin hydrocarbon comprises normal pentane.

12. The process of claim 9 wherein said paraffin hydrocarbon is passed through said bulk supply of aluminum halide at a temperature of from about 120° F. to about 210° F.

13. The process of claim 3 further characterized in that said paraffin hydrocarbon comprises normal pentane.

14. The process of claim 1 further characterized in that said aluminum halide comprises aluminum chloride.

15. The process of claim 3 further characterized in that said aluminum halide comprises aluminum chloride.

JULIAN M. MAVITY.
WALTER E. MOSS.